United States Patent
Kinumura et al.

(10) Patent No.: US 7,978,384 B2
(45) Date of Patent: Jul. 12, 2011

(54) IMAGE PROCESSING SYSTEM, IMAGE PROCESSING APPARATUS, IMAGE PROCESSING METHOD, AND STORAGE MEDIUM THEREOF

(75) Inventors: Kengo Kinumura, Kanagawa (JP); Tsutomu Takayama, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 864 days.

(21) Appl. No.: 11/180,522

(22) Filed: Jul. 14, 2005

(65) Prior Publication Data
US 2005/0254077 A1 Nov. 17, 2005

Related U.S. Application Data

(62) Division of application No. 09/961,421, filed on Sep. 25, 2001, now Pat. No. 6,999,213.

(30) Foreign Application Priority Data

Sep. 29, 2000 (JP) ................................. 2000-299221
Aug. 9, 2001 (JP) ................................. 2001-242822

(51) Int. Cl.
*G03F 3/08* (2006.01)
*H04N 1/46* (2006.01)

(52) U.S. Cl. ........ 358/521; 358/505; 358/509; 358/518; 358/519

(58) Field of Classification Search .................. 358/3.13, 358/1.9, 2.1, 506, 300, 256, 505, 509, 518–521
See application file for complete search history.

(56) References Cited

U.S. PATENT DOCUMENTS

| | | | | |
|---|---|---|---|---|
| 4,364,084 A | * | 12/1982 | Akimoto et al. | 358/506 |
| 5,132,788 A | * | 7/1992 | Hirota | 358/517 |
| 5,148,289 A | * | 9/1992 | Nishiyama et al. | 358/300 |
| 5,461,462 A | * | 10/1995 | Nakane et al. | 399/15 |
| 5,710,871 A | * | 1/1998 | Tadenuma et al. | 358/1.9 |
| 6,034,788 A | * | 3/2000 | Sasanuma et al. | 358/406 |

(Continued)

FOREIGN PATENT DOCUMENTS

JP 63-010981 1/1988

(Continued)

OTHER PUBLICATIONS

Japanese Official Communication dated Feb. 17, 2009, regarding Japanese Application No. 2000-299221.

*Primary Examiner* — James A Thompson
*Assistant Examiner* — Jonathan R Beckley
(74) *Attorney, Agent, or Firm* — Fitzpatrick, Cella, Harper & Scinto (57) ABSTRACT

A construction is achieved at low cost which reduces the loss of gradation in a dark portion of an image that has been subjected to gamma correction in accordance with characteristics of a display. In an image reading apparatus, to make it possible to more finely reproduce the gradation in the dark portion, the number of gradations expressed by an signal obtained by a CCD is reduced by performing non-linear gamma correction using a gamma coefficient below one, and the resulting signal is transferred to a computer serving as a host computer. In the computer, the transferred signal is subjected to gamma correction using a gamma coefficient that is an inverse of the gamma coefficient used in the image reading apparatus, thereby canceling out the influence of the gamma correction performed in the image reading apparatus.

15 Claims, 8 Drawing Sheets

U.S. PATENT DOCUMENTS

| | | | | |
|---|---|---|---|---|
| 6,147,771 | A | 11/2000 | Washio | 358/1.9 |
| 6,183,933 | B1 * | 2/2001 | Ishikawa et al. | 430/256 |
| 6,538,771 | B1 * | 3/2003 | Sakatani et al. | 358/2.1 |
| 6,721,062 | B1 * | 4/2004 | Sawada et al. | 358/1.9 |
| 6,731,400 | B1 * | 5/2004 | Nakamura et al. | 358/1.9 |
| 6,771,815 | B2 * | 8/2004 | Yang et al. | 382/169 |
| 6,819,439 | B2 * | 11/2004 | Hayashi et al. | 358/1.13 |
| 7,199,900 | B2 * | 4/2007 | Ogatsu et al. | 358/1.9 |

FOREIGN PATENT DOCUMENTS

| | | |
|---|---|---|
| JP | 9-51436 | 2/1997 |
| JP | 9-321988 | 12/1997 |
| JP | 10-42136 | 2/1998 |
| JP | 10-173488 | 6/1998 |
| JP | 10-322567 | 12/1998 |
| JP | 11-8769 | 1/1999 |
| JP | 2000-307921 | 11/2000 |

* cited by examiner

| n | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| (1) 8bit→8bit 256*(n/256)^(1/2,2)= | 0 | 21 | 28 | 34 | 39 | 43 | 46 | 50 | 53 | 56 | 59 | 61 | 64 | 66 |
| (2) 12bit→8bit 256*(n/4096)^(1/2,2)= | 0 | 6 | 8 | 10 | 11 | 12 | 13 | 14 | 15 | 16 | 17 | 17 | 18 | 19 |
| (3) 16bit→8bit 256*(n/65536)^(1/2,2)= | 0 | 2 | 2 | 3 | 3 | 3 | 4 | 4 | 4 | 4 | 5 | 5 | 5 | 5 |

| | 14 | 15 | 16 | 17 | 18 | 19 | 20 | 21 | 22 | 23 | 24 | 25 | 26 |
|---|---|---|---|---|---|---|---|---|---|---|---|---|---|
| (1) | 68 | 70 | 73 | 75 | 77 | 78 | 80 | 82 | 84 | 86 | 87 | 89 | 91 |
| (2) | 19 | 20 | 21 | 21 | 22 | 22 | 23 | 23 | 24 | 24 | 25 | 25 | 26 |
| (3) | 5 | 6 | 6 | 6 | 6 | 6 | 6 | 7 | 7 | 7 | 7 | 7 | 7 |

IMAGE PROCESSING SYSTEM, IMAGE PROCESSING APPARATUS, IMAGE PROCESSING METHOD, AND STORAGE MEDIUM THEREOF

RELATED APPLICATION

This application is a division of application Ser. No. 09/961,421, filed on Sep. 25, 2001, the entire disclosure of which is incorporated herein by reference.

BACKGROUND OF THE INVENTION

1. Field of the Invention

The present invention relates to an image processing system, an image processing apparatus, an image processing method, and a storage medium.

2. Related Background Art

In a conventional image processing system constructed using an image reading apparatus and a host computer, an image signal obtained by the image reading apparatus is subjected to various image processing when being transferred to the host computer. For instance, the image signal is subjected to gamma correction and the like in order to display high-gradation images on a monitor display of the host computer.

To facilitate understanding of the problem to be solved by the present invention, an example that is conceived as a comparison example of the present invention is first described with reference to FIG. 2. In this example, the stated image processing is mainly performed by the image reading apparatus.

In this drawing, reference numeral 1 denotes a CCD; 2, an A/D converter that converts an analog electric signal generated by a photoelectric conversion operation of the CCD into a digital signal; 3, a line offset that obtains signals in respective colors of RGB by separating the digital signal sent from the A/D converter 2 in a state where these signals in RGB are mixed together; reference symbol 8a, a RAM that is a memory used by the line offset 3; reference numeral 4, a matrix circuit that generates a luminance signal and a color difference signal from the three primary color signals; 5, a lookup table (hereinafter referred to as the "LUT") including a gamma correction circuit that performs exponential conversion (hereinafter referred to as the "gamma correction") on the RGB signals according to display on a monitor, numeral 8b a RAM that is a memory used by the LUT 5; 6, an interface circuit (hereinafter referred to as the "I/F") that outputs the image signals to an external personal computer (hereinafter referred to as the "PC") 7; and reference symbol 8c, a RAM that is a memory used by the I/F 6.

If the sizes of the image signals outputted from the image reading apparatus are too large, this may cause a significant reduction in processing speed due to various factors, such as the limitation of the rate of data transfer over a cable between the image reading apparatus and the PC 7 (a host computer in this example) and the limitation of the throughput of the PC 7 that processes the image signals outputted from the image reading apparatus.

Also, in general, the number of gradations of an image that can be displayed by a display provided for the PC 7 is up to eight bits, so that the image reading apparatus converts each image signal into an 8-bit gradation image signal and transmits it to the PC 7.

In usual cases, the A/D converter 2 converts the analog signal sent from the CCD 1 into a 12-bit to 16-bit gradation image signal by performing an A/D conversion operation. Then, the line offset 3 obtains signals in RGB by separating the signal that was sent from the A/D converter 2 in a state where these signals in RGB are mixed together. These signals are each converted by the matrix circuit 4 into a 12-bit to 16-bit signal. Then, the 12-bit to 16-bit signal is converted into an 8-bit signal by the LUT 5 and the 8-bit signal is sent to the PC 7.

Another comparison example of the present invention is next described with reference to FIG. 3. This drawing shows a case where a large portion of the stated image processing is performed by the PC.

In this drawing, a signal obtained by a CCD 21 is A/D converted by an A/D converter 22 and is sent to a PC 28 via an I/F 23 that outputs signals to the outside. In the PC 28, a line offset 24 processes the signal sent via the I/F 23 in the same manner as the line offset 3 described above. Then, each signal outputted from the line offset 24 is subjected to matrix conversion by a matrix circuit 25 and is subjected to gamma correction by an LUT 26. Following this, image display is performed.

In this case, the CCD 21 performs photoelectric conversion to obtain an image signal and the image signal is usually A/D converted into an 8-bit signal by the A/D converter 22. All processing after this A/D conversion, which is to say the processing from the transmission to the PC 28 via the I/F 23 to the processing by the LUT 26, is performed in units of eight bits.

Figure 2:
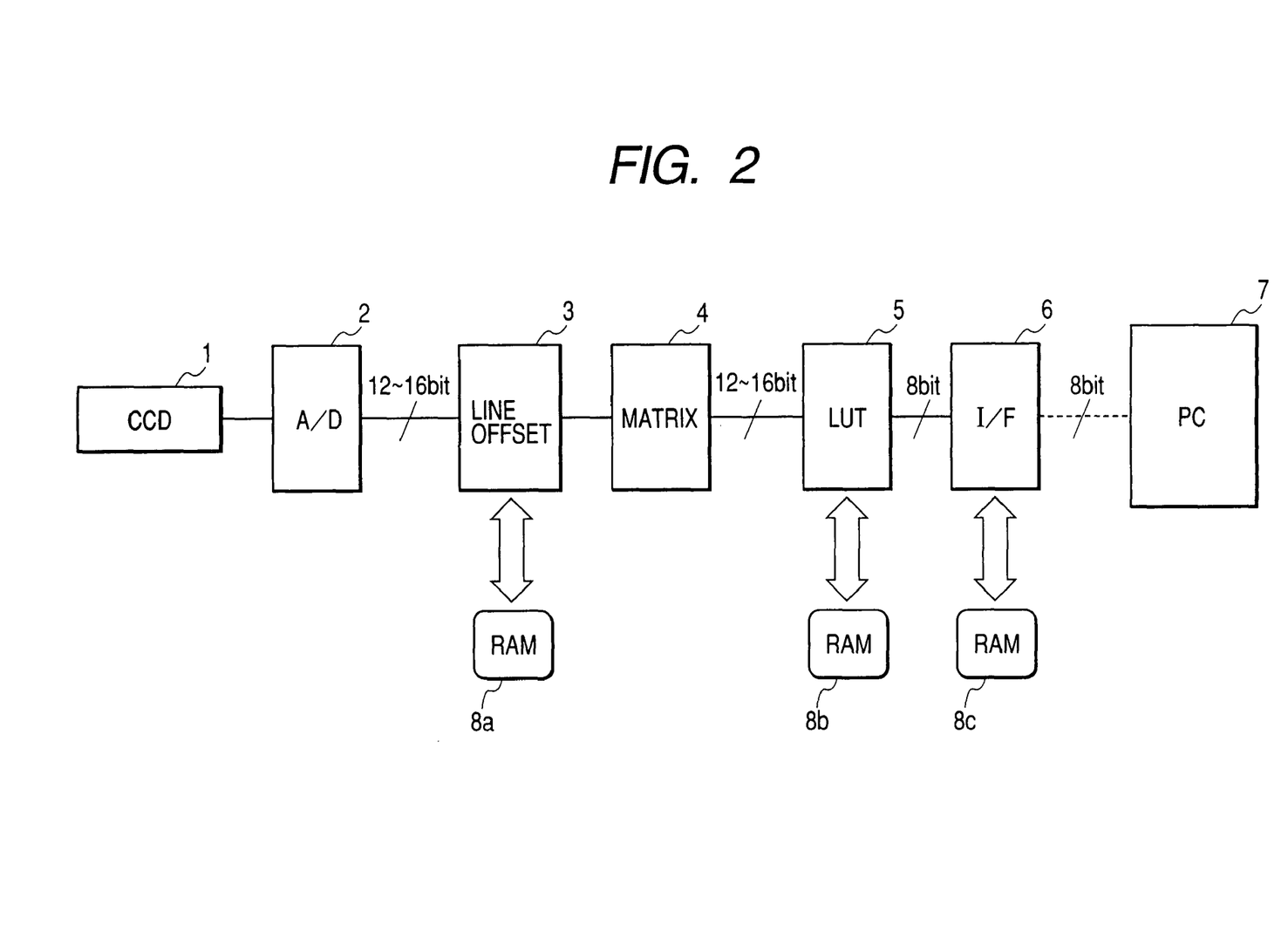
FIG. 2 shows a construction of a comparison example to explain the problem to be solved by the present invention, where image processing is mainly performed by an image reading apparatus.

In the case shown in FIG. 2, there is a problem that an increase in cost is inevitable because there are provided three RAMs in the image reading apparatus.

Also, in the case shown in FIG. 3, there occurs a problem called "tone jump" that will be described in detail below.

Figure 5:
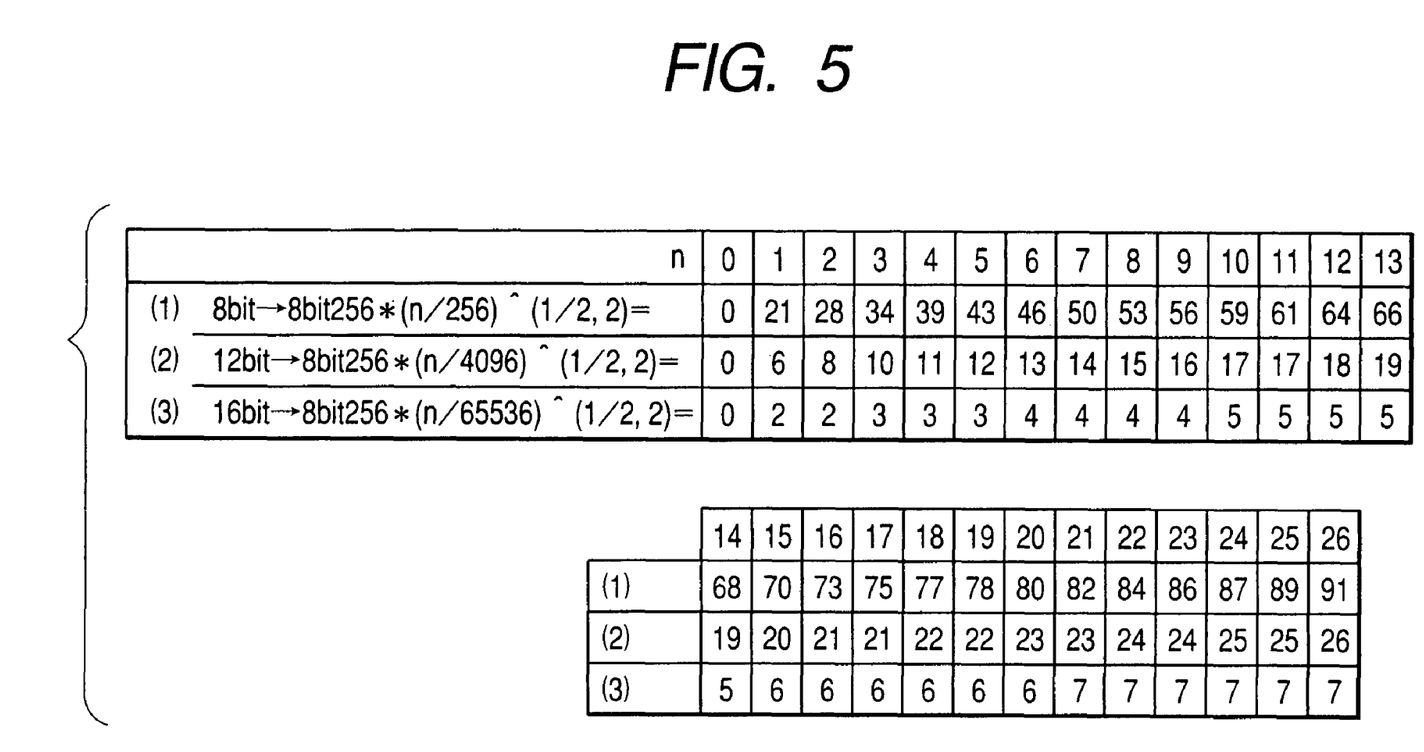
FIG. 5 shows a table showing output signals obtained by performing gradation conversion and gamma correction on input signals.

The reason for which tone jump occurs is described. In the case shown in FIG. 3, it is necessary that the LUT 26 processes signals outputted from the image reading apparatus by performing inverse gamma correction according to the gamma characteristic of a display. In the case of a PC with a Microsoft Windows operating system, gamma correction is generally performed by applying a gamma of 1/2.2. The following is a description of a case where a PC with the Microsoft Windows operating system performs gamma correction by applying a gamma of 1/2.2. FIG. 5 shows three output gradation levels for each input gradation level in dark portions (at 0th to 80th gradation levels out of 256 gradation levels). In this drawing, a gamma of 1/2.2 is applied to 8-bit gradation image signals. Also, in this drawing, the top row shows input levels and lower rows show output levels obtained from each input level, with these output levels corresponding to conversion of an 8-bit input signal into an 8-bit output signal, conversion of a 12-bit input signal into an 8-bit signal, and conversion of a 16-bit signal into an 8-bit signal, respectively.

Figure 3:
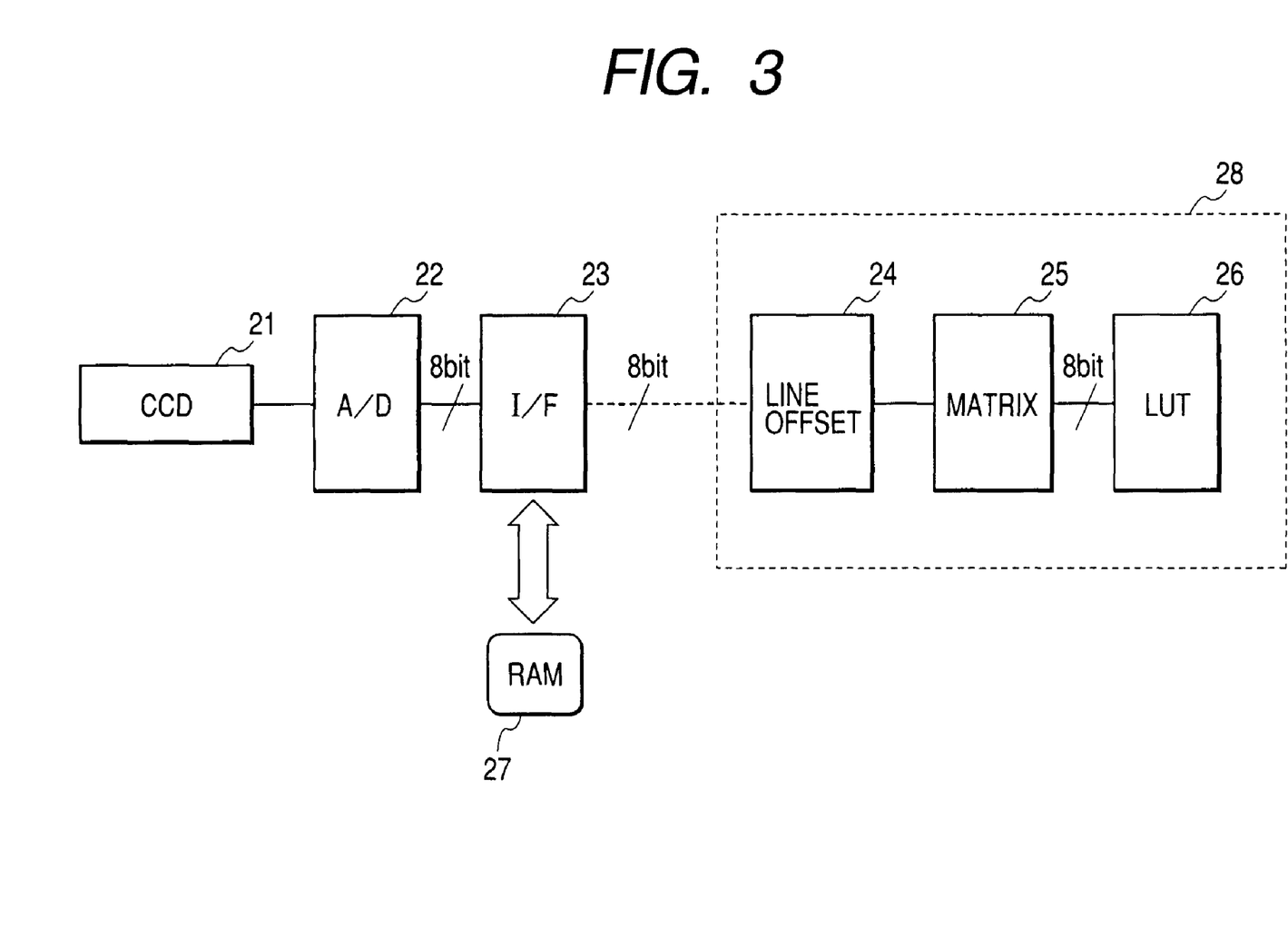
FIG. 3 shows a construction of another comparison example to explain the problem to be solved by the present invention, where the image processing is mainly performed by a PC serving as a host computer.

In the case shown in FIG. 3, a signal inputted into the LUT 26 and a signal outputted from the LUT 26 are both an 8-bit signal, so that the case shown in FIG. 3 corresponds to the case marked (1) in FIG. 5. Therefore, assuming that an inverse gamma of 1/2.2 is applied to an input signal at an nth gradation level, the gradation level of a corresponding output signal is obtained from a calculation of $256 \times (n/256)^{(1/2.2)}$. That is, in the case shown in FIG. 3, when a signal at the 1st level is inputted, this input signal results in an output signal at the 21st level due to the application of the gamma coefficient of 1/2.2. Consequently, it is impossible to generate output signals at the 0th to 20th levels from input signals at the 1st and higher levels. Similarly, when a signal at the 2nd level is inputted, a signal at the 28th level is outputted, as shown in FIG. 5. In other words, when the gamma coefficient of 1/2.2 is applied in the case shown in FIG. 3 where an input image signal and an output image signal are both an 8-bit signal, output signals at the 0th to 20th levels (in the vicinity of dark levels) are not generated, as indicated by an example of a histogram shown in FIG. 4. As a result, there occurs the "tone jump" problem.

Figure 4:
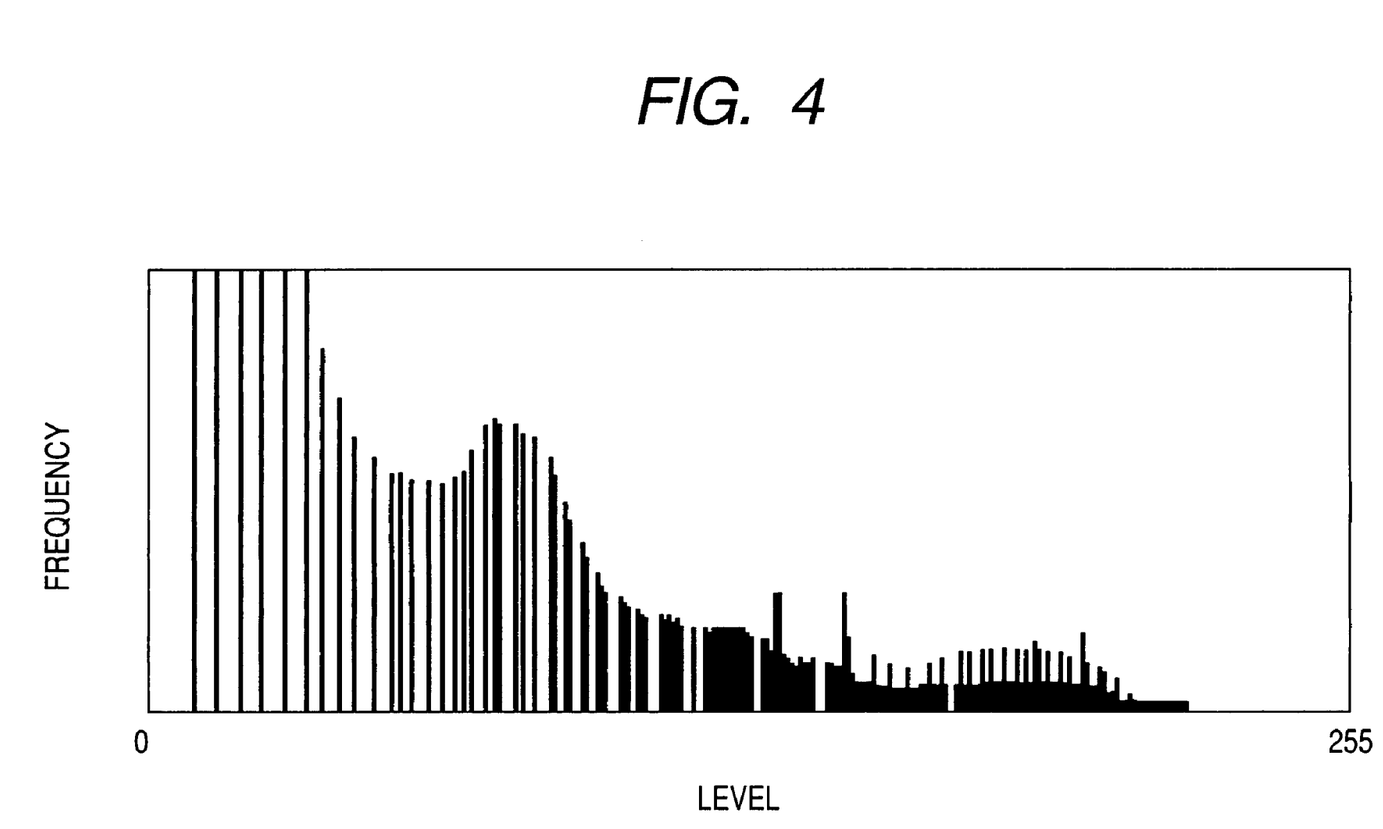
FIG. 4 shows an example of a histogram concerning an image where tone jump occurs.

It should be noted here that in FIG. 4, the horizontal axis represents output gradation levels and the vertical axis represents the occurrence frequency of each output gradation level in a given image of one screen. Also, note that in the case shown in FIG. 2, a 12-bit to 16-bit signal is inputted into the LUT 5 and an 8-bit signal is outputted therefrom. In this case, as can be seen from the cases marked (2) and (3) in FIG. 5, the occurrence frequency of tone jump is reduced, in comparison with the case shown in FIG. 3 (corresponding to the case marked (1) in FIG. 5) where a signal inputted into the LUT 26 and a signal outputted from the LUT 26 are both an 8-bit signal. In the case shown in FIG. 2, however, there is a problem that three RAMs are provided in the image reading apparatus and therefore an increase in cost is inevitable. On the other hand, in the case shown in FIG. 3, the number of RAMs installed in the image reading apparatus is reduced to one. As a result, in this case, it is possible to reduce the cost of the image reading apparatus, in comparison with the case shown in FIG. 2, although the occurrence frequency of tone jump is increased as described above. Also, if not an 8-bit signal but a 12-bit to 16-bit signal is sent from the image reading apparatus to the PC in the case shown in FIG. 3, it is possible to reduce the occurrence frequency of tone jump. In this case, however, there is a problem in that the amount of data to be sent is increased and therefore the time period for transferring image signals is increased several fold. This means that the transfer of a 12-bit to 16-bit signal to the PC is not a realistic solution.

SUMMARY OF THE INVENTION

In view of these problems, an object of the present invention is to provide an image processing system, an image processing apparatus, an image processing method, and a storage medium that make it possible to shorten the time period for transferring image signals without causing tone jump and degradation of image quality. Also, another object of the present invention is to achieve a construction at low cost which reduces the occurrence frequency of the loss of gradation in a dark portion of an image subjected to gamma correction in accordance with the characteristics of a display.

The stated objects are achieved by an image processing system including: an image reading apparatus including a photoelectric conversion means for photoelectrically converting a target image into an image signal and outputting the image signal, a first conversion means for performing gradation conversion and gamma correction on the image signal outputted from the photoelectric conversion means, and an output means for outputting the image signal converted by the first conversion means; and an apparatus including an input means for inputting the image signal outputted from the output means, and a second conversion means for performing gradation conversion and gamma correction on the image signal inputted by the input means.

Here, it is preferable that a gamma coefficient used by the first conversion means and a gamma coefficient used by the second conversion means are in an inverse relation.

Also, it is preferable that the gamma coefficient used by the first conversion means is equal to an inverse of a gamma coefficient used by a display that reproduces the image signal converted by the second conversion means as a visible image.

Further, it is preferable that the image processing system further includes a light source that illuminates the target image.

The stated objects are also achieved by an image processing method including: a step for photoelectrically converting a target image into an image signal and outputs the image signal; a step for performing gradation conversion and gamma correction on the outputted image signal using a first conversion means; a step for outputting the image signal converted by the first conversion means from an image reading apparatus; a step for inputting the outputted image signal; and a step for performing gradation conversion and gamma correction on the inputted image signal using a second conversion means.

The stated objects are further achieved by a computer-readable storage medium storing a program that allows a computer to perform this image processing method.

The stated objects are further achieved by an image processing system including an image reading apparatus and a computer that are connected to each other, the image reading apparatus including: a signal input means for optically reading an original image and generating an image signal; a first gamma correction means for performing gradation conversion and gamma correction on the image signal; and a transmission means for transmitting the image signal corrected by the first gamma correction means to the computer, and the computer including: an input means for inputting the image signal from the image reading apparatus; a second gamma correction means for performing gradation conversion and gamma correction on the image signal inputted by the input means; and a third gamma correction means for performing gradation conversion and gamma correction on the image signal corrected by the second gamma correction means, the gamma correction by the third gamma correction means being performed to output the image signal.

The present invention relates to an image processing system, an image processing apparatus, an image processing method, and a storage medium that achieve new functions.

The functions and features of the prevent invention will become further apparent from the following embodiments described in conjunction with the accompanying drawings.

DETAILED DESCRIPTION OF THE PREFERRED EMBODIMENTS

Embodiments

First Embodiment

The first embodiment of the present invention is described in detail below with reference to the drawings.

Figure 1:
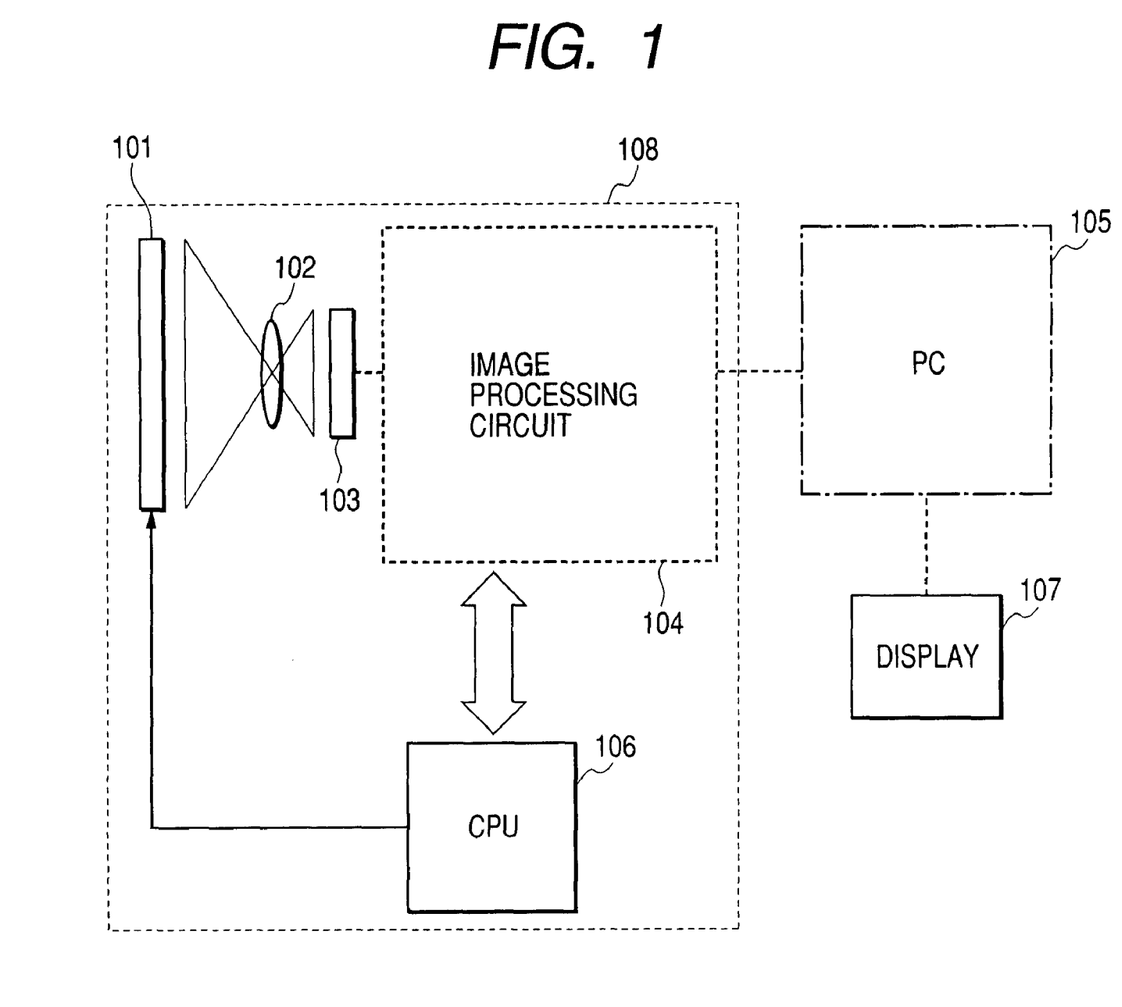
FIG. 1 shows the outline of a construction of an image processing apparatus.

FIG. 1 shows an example construction of an image reading apparatus of this embodiment.

In this drawing, reference numeral 101 denotes a light source where the amount of light emitted therefrom can be controlled; 102, a lens that forms an image from light reflected by and passing through a source document; 103, a photoelectric conversion element for converting the image forming light into an electric signal (in this embodiment, the photoelectric conversion element is a CCD line sensor having three lines that are each formed by applying a film in one of three colors of RGB, and is hereinafter referred to as the "CCD"); 104, an image processing circuit that processes the electric signal; 105, a PC that serves as a host computer; 106, a CPU that controls the operation of the image reading apparatus; 107, a display that displays an image read from the source document; and 108, the whole of the image reading apparatus.

When an image is read from the source document, the light emitted from the light source 101 is reflected by or passes through the source document, forms an image by passing through the lens 102, and is converted into an electric signal by the CCD 103. This electric signal is subjected to image processing by the image processing circuit 104 of the image reading apparatus and the host PC 105, and then is displayed by the display 107.

Figure 6:
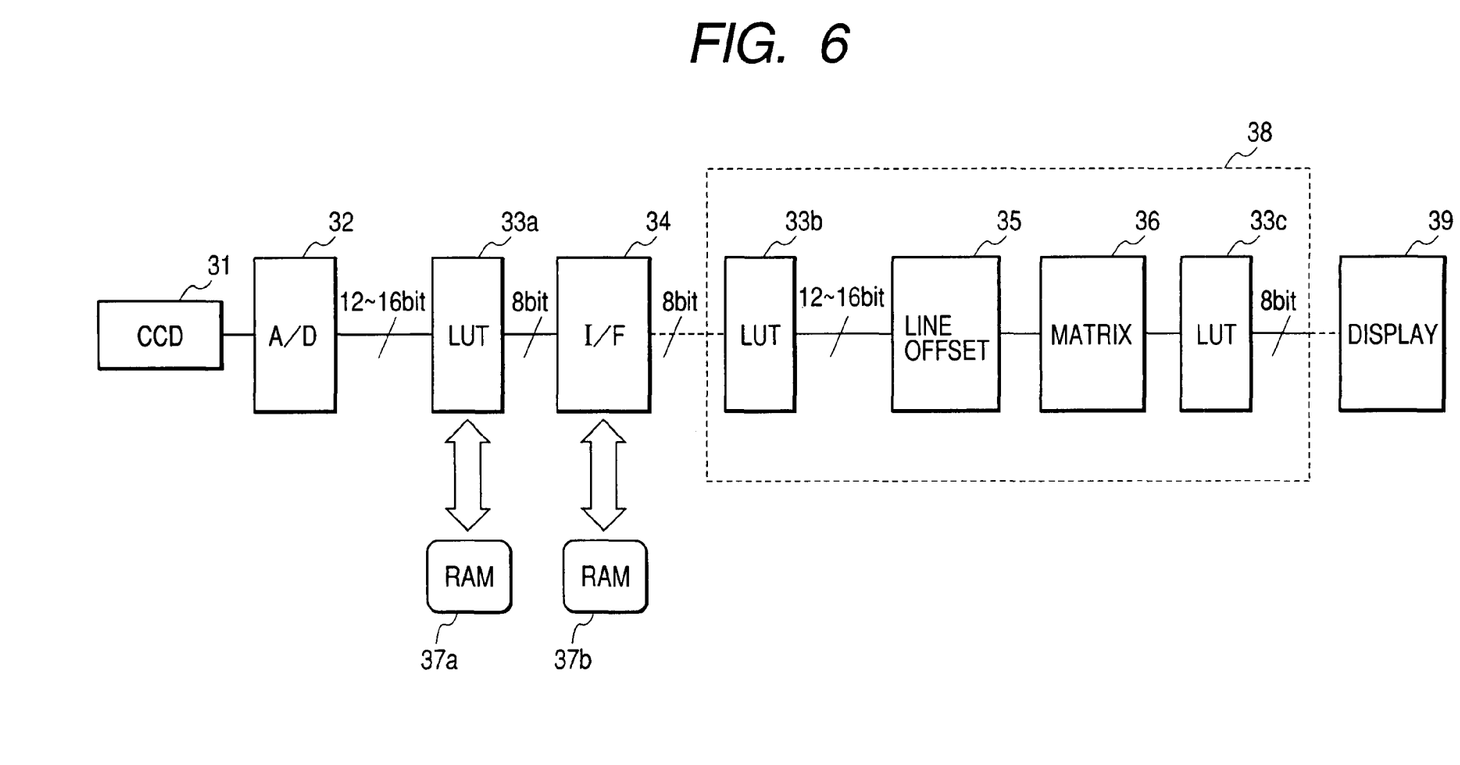
FIG. 6 is a block diagram illustrating an embodiment of the present invention.

FIG. 6 is a block diagram showing a construction of the image reading apparatus of this embodiment of the present invention. In this drawing, reference numeral 31 denotes a CCD that converts image forming light into an electric signal; 32, an A/D converter that converts the analog electric signal generated by the photoelectric conversion into a digital signal; reference symbols 33a to 33c, LUTs that perform gamma correction; reference numeral 34, an interface circuit (hereinafter referred to as the "I/F") that outputs the digital signal to a PC 38; 35, a line offset that obtains signals in RGB by separating the digital signal sent in a state where these signals in RGB are mixed together; 36, a matrix circuit that generates a luminance signal and a color difference signal from the three primary color signals; reference symbol 37a, a RAM that is a memory used by the LUT 33a; 37b, a RAM that is a memory used by the I/F 34; reference numeral 38, a PC serving as a host computer, and 39, a display that displays an image read from a source document.

The operation according to this embodiment of the present invention is described below.

In FIG. 6, an electric signal generated by the CCD 31 is sent to the A/D converter 32, which then converts the electric signal into a 12-bit to 16-bit gradation image signal. It should be noted here that to facilitate understanding of this embodiment, in the following explanation, it is assumed that the electric signal is converted into a 16-bit gradation image signal. Then, the LUT 33a performs gradation conversion to convert the 16-bit gradation image signal into an 8-bit gradation image signal. The 8-bit gradation image signal is transferred to the PC 38. At this time, in this embodiment, linear gradation conversion is not performed but gradation conversion is performed using a gamma coefficient A. Then, the signal subjected to the gradation conversion is transferred to the PC 38 via the I/F 34. Following this, in the PC 38, the LUT 33b subjects the 8-bit gradation image signal to gradation conversion again to revert the 8-bit gradation image signal to a 16-bit gradation image signal. Here, the LUT 33b performs this gradation conversion by applying a gamma coefficient 1/A that is an inverse coefficient of the gamma coefficient applied in the image reading apparatus. Then, the line offset 35 separates the 16-bit gradation image signal into each signal in one of colors of RGB, the matrix circuit 36 performs matrix conversion on these signals outputted from the line offset 35, the LUT 33c performs gradation conversion to convert the 16-bit gradation image signals outputted from the matrix circuit 36 into 8-bit gradation image signals using a gamma coefficient of 1/2.2 that matches the characteristics of the display, and the 8-bit gradation image signals are sent to the display 39.

In this embodiment, although 8-bit gradation image signals are transferred to the PC 38, the 8-bit gradation image signals are reverted to 16-bit gradation image signals by the LUT 33b. As can be seen from the case marked (3) in FIG. 5, the reversion into the 16-bit gradation image signals reduces the occurrence frequency of tone jump in image signals converted into 8-bit gradation image signals by the LUT 33c for output to the display 39. Here, during the gradation conversion after the matrix conversion by the matrix circuit 36, the LUT 33c performs gamma correction according to the properties of the display 39. Also, in this embodiment, the LUT 33a applies a gamma coefficient A below one during the conversion of 16-bit gradation image signals into 8-bit gradation image signals. As a result, a large number of gradations are given to a dark portion, in comparison with a case of gradation conversion having a linear characteristic. This makes it possible to obtain an image including a detailed dark portion.

The reason these effects are obtained in this embodiment is further described with reference to FIGS. 7A to 7C.

Figure 7A:
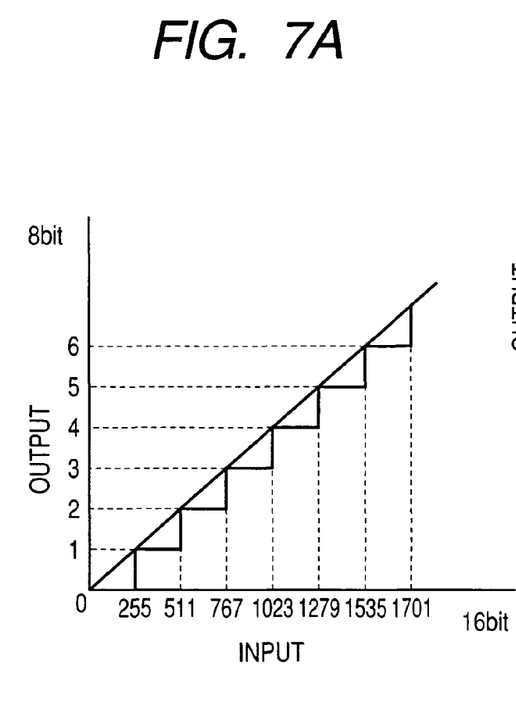
FIGS. 7A, 7B and 7C are graphs giving output signals obtained by performing gradation conversion and gamma correction on input signals.
Figure 7B:
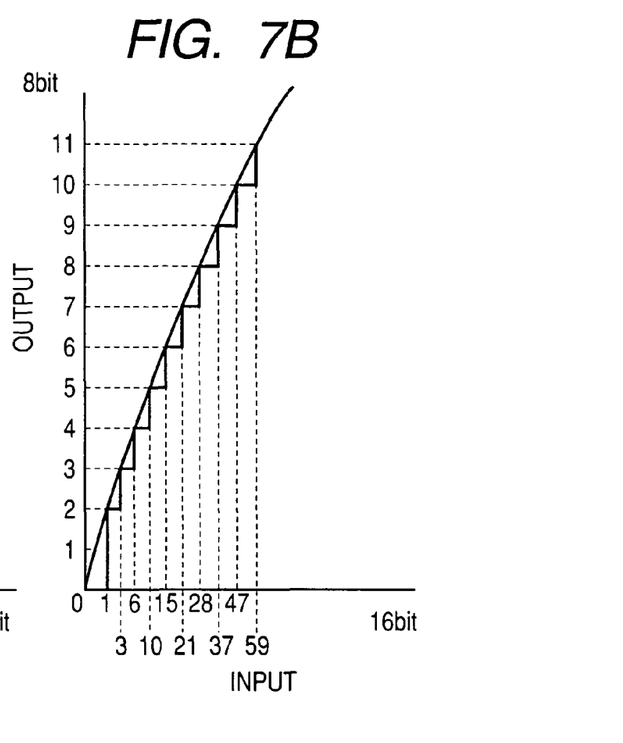
Figure 7C:
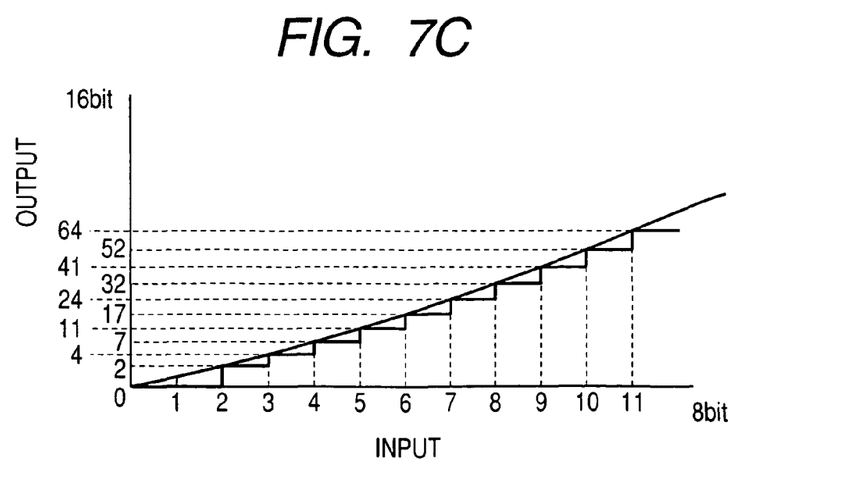

FIGS. 7A to 7C show 8-bit gradation image signals obtained by converting 16-bit gradation image signals in the manner described above. In other words, these drawings show 8-bit gradation image signals obtained by setting the gamma coefficient A as one and 1/2.2.

In these drawing, the horizontal axis represents the levels of image signals inputted into the LUT and the vertical axis represents the levels of image signals outputted therefrom. FIG. 7A concerns a case where 16-bit gradation input signals are converted into 8-bit gradation output signals using a gamma having a linear characteristic. In this case, all input signals at the 0th to 255th levels are converted into output signals at the 0th level. Also, all of input signals at the 256th to 511th levels are converted into output signals at the 1st and higher levels. This is a gradation conversion that is usually performed. In this case, as described above, all of the 0th to 255th gradation levels represented by 16-bit gradation image signals on the input side are lost when being converted into 8-bit gradation image signals, which leads to the reduction in reproducibility in a dark portion. FIG. 7B concerns a case where 16-bit gradation image signals are inputted and 8-bit gradation image signals obtained by applying a gamma coefficient of 1/2.2 to the 16-bit gradation image signals are outputted. In this case, an input signal at the 0th level results in an output signal at the 0th level, input signals at the 1st and 2nd levels result in output signals at the 2nd level, input signals at the 3rd to 5th levels result in output signals at the 3rd level, and input signals at the 6th to 9th levels result in output signals at the 4th and higher levels. That is, in the case shown in FIG. 7A, all input signals in a dark portion at the 0th to 255th levels result in output signals at the 0th level. However, in the case shown in FIG. 7B, the subtle changes in gradation observed in a dark portion is more finely reflected by 8-bit image signals by performing conversion with the application of the gamma coefficient of 1/2.2. FIG. 7C concerns a case where the 8-bit signals are converted into 16-bit signals by a PC. In this case, by applying a gamma coefficient 1/A that is an inverse coefficient of the gamma coefficient A applied by the LUT 33*a* shown in FIG. 6, the influence of the gamma coefficient A applied by the LUT 33*a* is canceled out and the loss of gradation in a dark portion is reduced. The graph in FIG. 7C shows output signals obtained by applying a gamma coefficient of 2.2 to input signals.

It should be noted here that it is suitable that the value of the gamma coefficient A is the same as that of the gamma coefficient applied by the LUT 33*c* shown in FIG. 6 for image display by the display 39.

As described in the section "Description of the Related Art" of this specification, the standard gamma value of the PC 38 varies depending on the operation system (OS) thereof. As typical examples, the standard gamma value in the case of the Microsoft Windows operating system is 1/2.2 and the standard gamma value in the case of an Apple Macintosh operating system is 1/1.8. Also, a user adjusts the gamma curve used by the LUT 33*c* by adjusting, for instance, a highlight value and a shadow value according to a scanned original image. Therefore, it is not appropriate to set the gamma A of this embodiment at a fixed value. Accordingly, in this embodiment, when a gamma value in the LUT 33*c* adjusted by the user is referred to as A1, the gamma value used by the LUT 33*a* is set as A1 and a gamma value used by the LUT 33*b* to linearly revert signals to original ones is set as 1/A1. Accordingly, it becomes possible to improve the reproducibility of gradations in a level range that is desirable to the user.

As described above, in this embodiment, the image reading apparatus is provided with one LUT and the PC 38 is provided with two LUTs, with each LUT performing gradation conversion and gamma correction. By appropriately setting the gamma values used by these LUTs, it becomes possible to reduce the occurrence frequency of tone jump in a dark portion without increasing the transfer bit width from eight bits to transfer data from the image reading apparatus to the PC 38. Also, it is possible to reduce the cost of the image reading apparatus because the number of RAMS that are required by the image reading apparatus is only two. Further, it is possible to obtain gradation reproducibility corresponding to the adjustment made by the user.

Figure 8:
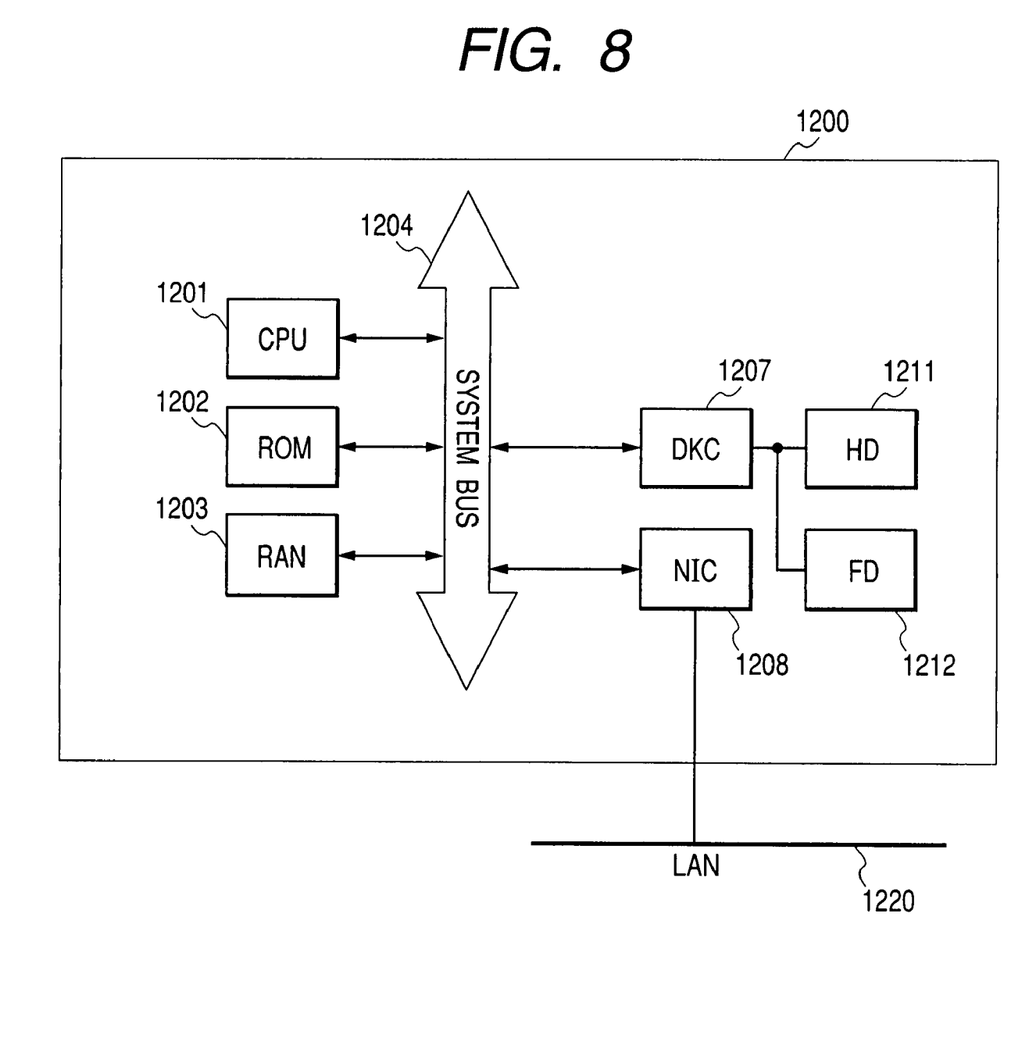
FIG. 8 is a block diagram showing an example of a computer system constituting a control apparatus of an image reading apparatus of the embodiment of the present invention.

FIG. 8 shows an example of a computer system that is a PC constituting the image reading apparatus of this embodiment of the present invention.

In other words, FIG. 8 shows a construction of a PC that serves as a control apparatus of a general image reading apparatus. In FIG. 8, reference numeral 1200 denotes the PC. This PC 1200 includes a CPU 1201 that executes network printing device control software stored in a ROM 1202, on a hard disk (HD) 1211, or on a floppy disk (FD) 1212. In the PC 1200, the operation of each device connected to a system bus 1204 is controlled by the execution of the network printing device control software by the CPU 1201.

Reference numeral 1203 denotes a RAM serving as a main memory, a work area, and the like of the CPU 1201. Reference numeral 1207 represents a disk controller (DKC) that controls the access to the hard disk (HD) 1211 and the floppy disk (FD) 1212 that store a boot program (a starting program for starting the execution (operation) of hardware and software of the PC), a plurality of applications, an editing file, a user file, a network management program and the like.

Reference numeral 1208 denotes a network interface card (NIC) through which the image reading apparatus of this embodiment is connected to a LAN 1220. In this embodiment of the present invention, the hard disk (HD) 1211 stores a program that achieves the foregoing internal functions of the image reading apparatus shown in FIG. 6 using the CPU 1201, the main memory, the disk controller (DKC) 1207, and the boot program (a starting program for starting the execution (operation) of hardware and software of the PC).

Other Embodiments of the Present Invention

It does not matter whether the present invention is applied to a system constructed using a plurality of devices (a host computer, an interface device, a reader, a printer and the like) or to an apparatus composed of a single device.

Also, the present invention includes a case where a software program code is generated to realize the functions described in the aforementioned embodiment by the operations of various devices, the software program code is supplied to a computer provided in an apparatus or system connected to the various devices, and the various devices operate according to the program stored in the computer (CPU or MPU) of the system or apparatus, thereby realizing the functions described in the aforementioned embodiment.

Also, in this case, the software program code itself realizes the functions described in the aforementioned embodiment. Therefore, the present invention may be achieved by the program code itself. Also, the present invention may be achieved by a means for supplying the program code to a computer, such as a storage medium storing the program code. For instance, a floppy disk, a hard disk, an optical disk, a magneto-optical disk, a CD-ROM, a magnetic tape, a nonvolatile memory card, or a ROM may be used as the storage medium storing the program code.

Also, in addition to the case where the functions described in the aforementioned embodiment are realized by a computer executing the supplied program code, the present invention includes a case where the program code is stored in a memory provided on a feature expansion board of a computer or a feature expansion unit connected to the computer and then a CPU or the like of the feature expansion board or the feature expansion unit performs all or a part of actual processing according to the contents of the program code, thereby realizing the functions described in the aforementioned embodiment.

Also, in the first embodiment of the present invention, an image reading apparatus provided with a light source for illuminating a source document is described as an example. However, the present invention is not limited to this embodiment and is applicable to a case where another image reading apparatus is used. For instance, it is possible to use a digital still camera or a video camera that generates digital moving picture data and has a digital interface.

As described above, with the technique of the present invention, it becomes possible to shorten the time period for transferring image signals without causing tone jump and degradation of image quality. With the technique of the present invention, it also becomes possible to suppress a phenomenon where the loss of gradation occurs in an output image (in particular, in a dark portion) and to reduce the cost of an image reading apparatus without increasing the time period for transferring image signals.

What is claimed is:

1. An image processing system in which an image reading apparatus for reading an original image and a computer for processing data of the read original image are connected, said image reading apparatus comprising a reading unit configured to generate image data by reading the original image, a first conversion unit configured to convert the image data to obtain a gradation lower than that of the image data and for performing gamma correction, and a transfer unit configured to transfer the image data converted by the first conversion unit to the computer, and said computer comprising a second conversion unit configured to convert the image data transferred from the image reading apparatus to obtain a gradation higher than that of the transferred image data, and for performing gamma correction, wherein a value of gamma of the gamma correction by the second conversion unit is an inverse number of a value of gamma of the gamma correction by the first conversion unit.

2. An image processing system according to claim 1, wherein the image processing system further includes a gamma correction unit configured to convert the image data converted by the second conversion unit to obtain a gradation lower than that of the converted image data, and for performing gamma correction.

3. An image processing system according to claim 2, wherein the value of gamma of the gamma correction by the first conversion unit is equivalent to a value of gamma of gamma correction by the gamma correction unit.

4. An image processing system according to claim 2, further comprising a display control unit configured to cause a display, connectable to the image processing system, to display the image data converted by the gamma correction unit.

5. An image processing system according to claim 4, wherein a gamma coefficient used by the gamma correction unit is equal to a gamma coefficient of the display.

6. An image processing apparatus which is connected to an image reading apparatus which comprises a reading unit configured to generate image data by reading an original image, and a first conversion unit configured to perform a gradation conversion process to convert the generated image data into image data of a gradation lower than that of the generated image data, and which performs gamma correction, the image processing apparatus comprising:

a receiving unit configured to receive the image data, converted by the first conversion unit, from the image reading apparatus; and a second conversion unit configured to perform a gradation conversion process to the image data received by the receiving unit to convert the received image data into image data of a gradation higher than that of the received image data, and for performing gamma correction, wherein a value of gamma of the gamma correction by the second conversion unit is an inverse number of a value of gamma of the gamma correction by the first conversion unit.

7. An image processing apparatus according to claim 6, further comprising a third conversion unit configured to perform gamma correction to the image data converted by the second conversion unit and to convert the image data converted by the second conversion unit into image data of which gradation is lower than that of the image data.

8. An image processing apparatus according to claim 7, wherein the value of gamma of the gamma correction by the first conversion unit is equivalent to a value of gamma of the gamma correction by the third correction unit.

9. An image processing apparatus according to claim 7, further comprising a display control unit configured to cause a display, connectable to the image processing apparatus, to display the image data converted by the third conversion unit.

10. An image processing apparatus according to claim 9, wherein a gamma coefficient used in the gamma correction performed by the third conversion unit is equal to a gamma coefficient of the display.

11. A control method for an image processing apparatus which is connected to an image reading apparatus which comprises a reading unit configured to generate image data by reading an original image, and a first conversion unit configured to perform a first gradation conversion process step to convert the generated image data into image data of a gradation lower than that of the generated image data, and which performs gamma correction, the method comprising:

receiving image data, converted by the first conversion unit, from the image reading apparatus; and performing a second gradation conversion process step on the received image data to convert the received image data into image data of a gradation higher than that of the received image data, and to perform gamma correction, wherein a value of gamma of the gamma correction in the second gradation conversion process is an inverse number of a value of gamma of the gamma correction by the first conversion unit.

12. A non-transitory computer-readable medium having a program stored thereon for causing the execution of a control method for an image processing apparatus which is connected to an image reading apparatus which comprises a reading unit configured to generate image data by reading an original image, and a first conversion unit configured to perform a first gradation conversion process step to convert the generated image data into image data of a gradation lower than that of the generated image data, and which performs gamma correction, the method comprising:

receiving image data, converted by the first conversion unit, from the image reading apparatus;

performing a second gradation conversion process step on the received image data to convert the received image data into image data of a gradation higher than that of the received image data, and to perform gamma correction; and wherein a value of gamma of the gamma correction in the second gradation conversion process is an inverse number of a value of gamma of the gamma correction by the first conversion unit.

13. An image reading apparatus which is connected to a computer comprising a second conversion unit configured to convert image data transferred from the image reading apparatus into image data having a gradation higher than that of the transferred image data and perform gamma correction to the transferred image data, the image reading apparatus comprising:

a reading unit configured to generate the image data by reading an original image;

a first conversion unit configured to convert the image data into image data having gradation lower than that of the generated image data and perform gamma correction to the generated image data; and a transferring unit configured to transfer the image data converted by the first conversion unit to the computer, wherein a value of gamma in the gamma correction by the first conversion unit is an inverse number of a value of gamma in the gamma correction by the second conversion unit.

14. A control method for an image reading apparatus which is connected to a computer comprising a second conversion unit configured to convert image data transferred from the image reading apparatus into image data having a gradation higher than that of the transferred image data and perform gamma correction to the transferred image data, the method comprising:

generating image data by reading an original image;
converting the image data into image data having gradation lower than that of the generated image data and performing gamma correction to the generated image data; and
transferring the converted image data to the computer,
wherein a value of gamma in the gamma correction is an inverse number of a value of gamma in the gamma correction by the second conversion unit.

15. A non-transitory computer-readable medium having a program stored thereon for causing the execution of a control method for an image reading apparatus which is connected to a computer comprising a second conversion unit configured to convert image data transferred from the image reading apparatus into image data having a gradation higher than that of the transferred image data and perform gamma correction to the transferred image data, the method comprising:

generating image data by reading an original image;
converting the image data into image data having gradation lower than that of the generated image data and performing gamma correction to the generated image data; and
transferring the converted image data to the computer,
wherein a value of gamma in the gamma correction is an inverse number of a value of gamma in the gamma correction by the second conversion unit.

* * * * *

Disclaimer

7,978,384 B2—Kengo Kinumra et al., Kanagawa (JP). IMAGE PROCESSING SYSTEM, IMAGE PROCESSING APPARATUS, IMAGE PROCESSING METHOD, AND STORAGE MEDIUM THEREOF. Patent dated July 12, 2011. Disclaimer filed April 8, 2011, by the assignee, Canon Kabushiki Kaisha.

The term of this patent shall not extend beyond the expiration date of patent no. 7,978,384.

(*Official Gazette January 10, 2012*)